United States Patent [19]
Underwood

[11] 3,870,614
[45] Mar. 11, 1975

[54] SELENIUM DEPOSITION
[75] Inventor: John Duckles Underwood, Bishop Stortford, England
[73] Assignee: International Standard Electric Corporation, New York, N.Y.
[22] Filed: June 6, 1974
[21] Appl. No.: 476,986

[52] U.S. Cl. ............................................... 204/181
[51] Int. Cl. ............................................. B01k 5/02
[58] Field of Search ................................. 204/181

[56] References Cited
UNITED STATES PATENTS
3,745,098  7/1973  Brown et al. ....................... 204/181

*Primary Examiner*—Howard S. Williams
*Attorney, Agent, or Firm*—John T. O'Halloran; Menotti J. Lombardi, Jr.; Vincent Ingrassia

[57] ABSTRACT

This relates to a method of depositing selenium in a suitable form for the manufacture of rectifiers. Selenium is electrophoretically deposited from a mixture of two selenium sols. The first sol is prepared by chemical reduction of selenous acid and the second by grinding and colloid milling metallic selenium.

8 Claims, 1 Drawing Figure

3,870,614
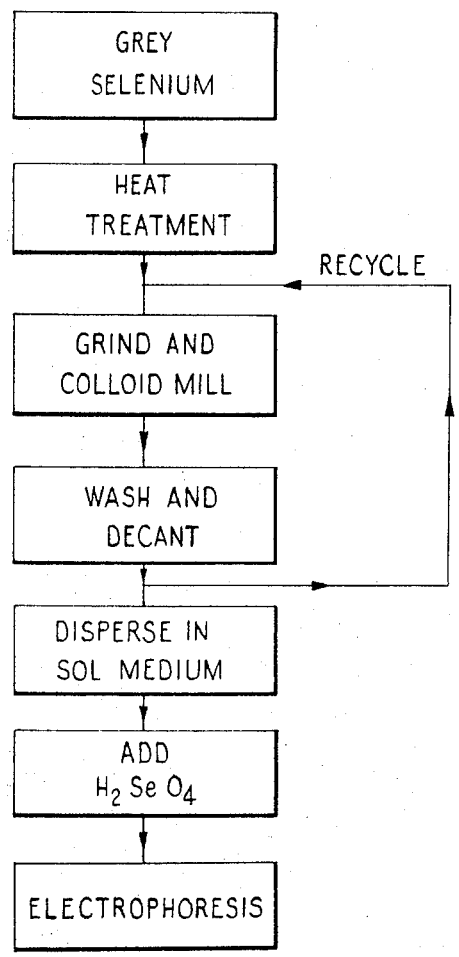

SELENIUM DEPOSITION

BACKGROUND OF THE INVENTION

This invention relates to the electrophoretic deposition of selenium and in particular to a method of depositing selenium in a form suitable for manufacturing rectifiers.

Selenium rectifiers are generally manufactured by evaporating layers of suitably treated selenium on to a metal electrode which may be either the "rectifying" or the "ohmic contact" electrode. This process produces reliable rectifiers, but the apparatus required is costly both to install and to maintain. Rectifiers are also manufactured by hot pressing selenium powder on to a suitable electrode, but this again involves costly equipment.

SUMMARY OF THE INVENTION

According to a broad aspect of the invention there is provided a method of electrophoretically depositing selenium comprising: colloid milling selenium with a liquid to a particle size suitable for forming a sol; washing the particles; dispersing the particles in a liquid to form a sol; adding a trace of selenic acid; and applying an electric field between electrodes immersed in the sol to deposit selenium on the cathode.

According to a further aspect of the invention there is provided a method of electrophoretically depositing selenium comprising: heating metallic selenium at 170°C for at least 1 hour; colloid milling the selenium with a liquid containing an anti-flocculation agent to a particle size suitable for forming a sol; washing the particles; dispersing the particles to form a sol in a mixture of ethanol and amyl alcohol containing traces of selenous and selenic acids; and applying an electric field between electrodes immersed in the sol to deposit selenium in the cathode.

BRIEF DESCRIPTION OF THE DRAWINGS

An embodiment of the invention will now be described with reference to the accompanying drawing which is a flow-sheet of a process for the electrophoretic deposition of selenium.

DESCRIPTION OF THE PREFERRED EMBODIMENTS

The selenium sol is prepared by a partly mechanical process. Grey or metallic selenium is prepared, e.g., by a conventional fusion process, containing a dopant much as gallium and/or indium, or with an additive such as chlorine together with a dopant. The selenium is heated in a furnace at 170°C for at least 1 hour to ensure that it is in a suitable allotropic form, and is then ground and milled in a colloid mill with a dispersant liquid such as glycerol. A small quantity of an anti-flocculation agent is added to prevent agglomeration of the selenium particles and to enhance the electrical charge formation on the particles.

Generally 100g selenium requires 400ml of liquid, which liquid may advantageously be an alcohol, or mixture of alcohols, containing an anti-flocculation agent (AFA). A liquid vehicle containing 75 weight percent ethanol (rectified spirit) and 25 weight percent amyl alcohol has been found satisfactory. 2 g AFA, for example DUOMEE TDM (Registered Trade Mark), per litre of this mixture is adequate.

After milling several times the colloidal particles are allowed to settle, the liquid is decanted and the particles are washed by decantation with an alcohol such as ethanol. The colloidal particles are then formed into a sol by dispersion in a sol medium typically consisting of:

75 weight percent rectified spirit
25 weight percent amyl alcohol
2 g selenous acid per 500 ml
0.2–2 ml 10 percent ethanolic selenic acid per 500 ml.

It is thought that the amyl alcohol acts as a moderator/stabilizer. Its viscosity reduces the mobility of the sol particles thus helping to maintain the sol in suspension. The selenous acid improves the quality of the final deposit and probably reduces polarization effects. Selenic acid ($H_2Se O_4$) renders the solution electrically conductive and is advantageously present in sufficient quantity (usually 0.2 to 2 ml per 500 mls solution) such that the current during electrophoresis is between 2 and 3 amps per square foot. This acid also prevents the sol from reaching its isoelectric point.

Electrophoresis may be performed on this solution in the usual manner, preferably using a platinized titanium electrode. The selenium is deposited at the cathode, not at the anode as is commonly experienced with selenium electroplating processes.

In some applications the selenium sol produced by the colloid mill may be mixed with methanol followed by 100 sol. hydrogen peroxide at the rate of 15ml per 25g selenium. After stirring for 4 hours at 40° to 50°C benzaldehyde is added to the sol. Other aromatic aldehydes, such as cinamaldehyde or anisaldehyde may be employed, but benzaldehyde is preferred as it produces a stable sol. The nature of the reaction involved in these steps is not fully understood but it is thought that the hydrogen peroxide produces a surface layer of selenium dioxide on the sol particles which layer is reduced to red selenium either before or during electrophoresis by the benzaldehyde.

Where the deposited selenium is to be used in rectifier applications it has been found necessary to deposit an initial flash coating of amophous (red) selenium on a nickel coated steel electrode preferably from a sol which may be prepared in a similar way to that previously described. This flash coating, which is between 2 and 3 microns thick, is fused at 310°–330°C and has the effect of wetting the electrode on which it is deposited. It is probable that nickel selenide is formed which acts as a flux. Further coatings of grey selenium may then be laid down to form the rectifier layers and the selenium layer may be fused without agglomeration into doplets and can be electrically formed in the usual way. The fusion step is necessary probably to orientate the anisotropic selenium deposit.

This electrophoresis process may also be employed in other applications where selenium films or coatings are required. For example, photovoltaic devices, non-linear resistors, varactor diodes and selenium coated plates for photocopies may also be prepared by this method.

It is to be understood that the foregoing description of specific examples of this invention is made by way of example only and is not to be considered as a limitation on its scope.

What is claimed is:

1. A method of electrophoretically depositing selenium comprising:
   colloid milling selenium with a liquid containing an antiflocculation agent to a particle size suitable for forming a sol;
   washing the particles;
   dispersing the particles in a liquid to form a sol;
   adding a trace of selenic acid; and
   applying an electric field between electrodes immersed in the sol to deposit selenium on the cathode.

2. A method of electrophoretically depositing selenium comprising:
   heating metallic selenium at 170°C for at least 1 hour;
   colloid milling the selenium with a liquid containing an antiflocculation agent to a particle size suitable for forming a sol;
   washing the particles;
   dispersing the particles to form a sol in a mixture of ethanol and amyl alcohol containing traces of selenous and selenic acids; and
   applying an electric field between electrodes immersed in the sol to deposit selenium in the cathode.

3. A method according to claim 2 further including the step of adding anti-flocculating agent to the dispersant liquid during the milling process.

4. A method according to claim 3 wherein the selenium particles are heated with 100 sol. hydrogen peroxide at 40°–50°C for 4 hours followed by reduction with an aromatic aldehyde.

5. A method according to claim 4 wherein said aromatic aldehyde is benzaldehyde.

6. A method of depositing selenium according to claim 2 wherein the selenium is deposited on a nickel-coated steel plate, which plate has a flash coating of fused red selenium.

7. A method according to claim 2 wherein said metallic selenium contains a dopant.

8. A method according to claim 2 wherein the current during electrophoresis is between 2 and 3 amps per square foot.

* * * * *

UNITED STATES PATENT OFFICE
CERTIFICATE OF CORRECTION

PATENT NO. : 3,870,614
DATED : March 11, 1975
INVENTOR(S) : John D. Underwood

It is certified that error appears in the above-identified patent and that said Letters Patent are hereby corrected as shown below:

On the Title page, insert --

[30] Foreign Application Priority Data

June 19, 1973   Great Britain...................28928/73

Signed and sealed this 20th day of May 1975.

(SEAL)
Attest:

RUTH C. MASON
Attesting Officer

C. MARSHALL DANN
Commissioner of Patents
and Trademarks